(12) United States Patent
Yao

(10) Patent No.: US 8,769,100 B2
(45) Date of Patent: Jul. 1, 2014

(54) METHOD AND APPARATUS FOR CLUSTER DATA PROCESSING

(75) Inventor: Jiandong Yao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 67 days.

(21) Appl. No.: 12/091,736

(22) PCT Filed: Apr. 25, 2008

(86) PCT No.: PCT/US2008/061600
§ 371 (c)(1),
(2), (4) Date: May 4, 2010

(87) PCT Pub. No.: WO2008/134527
PCT Pub. Date: Nov. 6, 2008

(65) Prior Publication Data
US 2010/0229026 A1     Sep. 9, 2010

(30) Foreign Application Priority Data

Apr. 25, 2007  (CN) .......................... 2007 1 0102649

(51) Int. Cl.
*G06F 15/16*  (2006.01)
*H04L 29/08*  (2006.01)
*G06F 11/20*  (2006.01)

(52) U.S. Cl.
CPC .................................. *H04L 67/1002* (2013.01)
USPC ............ 709/226; 709/235; 709/238; 714/4.1; 714/4.11

(58) Field of Classification Search
USPC .................. 709/226, 235, 238; 714/4.1, 4.11; 718/105
See application file for complete search history.

(56) References Cited

U.S. PATENT DOCUMENTS 6,195,680 B1 * 2/2001 Goldszmidt et al. .......... 709/203
6,351,775 B1 * 2/2002 Yu ................................. 709/238
(Continued)

FOREIGN PATENT DOCUMENTS

CN    1226704 A    8/1999
CN    1319816 A    10/2001
(Continued)

OTHER PUBLICATIONS

Translated Japanese Office Action mailed May 17, 2013 for Japanese patent application No. 2010-506526, a counterpart foreign application of U.S. Appl. No. 12/091,736, 5 pages.

(Continued)

*Primary Examiner* — Alina N Boutah
(74) *Attorney, Agent, or Firm* — Lee & Hayes, PLLC

(57) ABSTRACT

A cluster data processing method and system based on a unique identity control without requiring continuous network connection between the servers in the cluster and an external computer. The cluster sends a first data containing a controlling identity record to the external computer. The controlling identity record includes a unique identity and a control information. A load-balancing device of the cluster receives from the external computer a second data, which contains a controlling identity record corresponding to that of the first data. The cluster routes the second data according to the control information in the controlling identity record of the second data. The disclosed method and system may help avoid the overload problem of server resources and prevent low performance caused by continuous network connection that has to be maintained between the cluster and external server 190 in existing technology.

15 Claims, 5 Drawing Sheets

(56) References Cited

U.S. PATENT DOCUMENTS

| | | | |
|---|---|---|---|
| 6,446,218 B1 | 9/2002 | D'Souza | |
| 6,523,036 B1* | 2/2003 | Hickman et al. | 707/704 |
| 6,945,458 B1* | 9/2005 | Shah et al. | 235/385 |
| 6,970,933 B1* | 11/2005 | Masters | 709/229 |
| 7,062,570 B2* | 6/2006 | Hong et al. | 709/238 |
| 7,574,443 B2* | 8/2009 | Bahar et al. | 1/1 |
| 7,840,674 B1* | 11/2010 | Sterling | 709/226 |
| 7,870,153 B2* | 1/2011 | Croft et al. | 707/781 |
| 7,895,095 B2* | 2/2011 | Chollon et al. | 705/30 |
| 2002/0010762 A1* | 1/2002 | Kodama | 709/219 |
| 2003/0023669 A1* | 1/2003 | DeLima et al. | 709/203 |
| 2003/0074453 A1* | 4/2003 | Ikonen | 709/228 |
| 2003/0195984 A1* | 10/2003 | Zisapel et al. | 709/238 |
| 2004/0268358 A1* | 12/2004 | Darling et al. | 718/105 |
| 2005/0038890 A1* | 2/2005 | Masuda et al. | 709/224 |
| 2005/0038906 A1* | 2/2005 | Banes et al. | 709/238 |
| 2005/0172161 A1* | 8/2005 | Cruz et al. | 714/4 |
| 2005/0188055 A1* | 8/2005 | Saletore | 709/218 |
| 2006/0004796 A1* | 1/2006 | Nakamura | 707/100 |
| 2006/0047776 A1* | 3/2006 | Chieng et al. | 709/217 |
| 2006/0069761 A1* | 3/2006 | Singh et al. | 709/222 |
| 2006/0075089 A1* | 4/2006 | Alam et al. | 709/224 |
| 2006/0075101 A1* | 4/2006 | Anerousis et al. | 709/225 |
| 2006/0089965 A1* | 4/2006 | Fontes et al. | 709/203 |
| 2006/0146821 A1* | 7/2006 | Singh et al. | 370/390 |
| 2007/0094449 A1* | 4/2007 | Allison et al. | 711/119 |
| 2007/0133041 A1* | 6/2007 | Tredoux et al. | 358/1.15 |
| 2007/0150594 A1* | 6/2007 | Andreev et al. | 709/226 |
| 2007/0179981 A1* | 8/2007 | Vincent | 707/200 |
| 2007/0185997 A1* | 8/2007 | Stecher et al. | 709/226 |
| 2007/0192375 A1* | 8/2007 | Nakatani et al. | 707/200 |
| 2008/0066073 A1* | 3/2008 | Sen | 718/105 |
| 2008/0098113 A1* | 4/2008 | Hansen et al. | 709/226 |
| 2008/0183876 A1* | 7/2008 | Duvur et al. | 709/228 |
| 2009/0144444 A1* | 6/2009 | Chauffour et al. | 709/238 |
| 2009/0177720 A1* | 7/2009 | Shitomi et al. | 707/204 |
| 2010/0250646 A1* | 9/2010 | Dunagan et al. | 709/203 |
| 2011/0032824 A1* | 2/2011 | Eyuboglu et al. | 370/237 |

FOREIGN PATENT DOCUMENTS

| | | |
|---|---|---|
| JP | 11120108 | 4/1999 |
| JP | 2004206172 | 7/2004 |
| JP | 2005025756 | 1/2005 |
| JP | 2006085700 | 3/2006 |
| JP | 2007500889 | 1/2007 |
| WO | WO2005020085 | 3/2005 |

OTHER PUBLICATIONS

Translated Japanese Office Action mailed Dec. 22, 2011 for Japanese patent application No. 2010-506526, a counterpart foreign application of U.S. Appl. No. 12/091,736, 6 pages.

Translated Japanese Office Aciton mailed Aug. 10, 2012 for Japanese patent application No. 2010-506526, a counterpart foreign application of U.S. Appl. No. 12/091,736, 8 pages.

* cited by examiner

METHOD AND APPARATUS FOR CLUSTER DATA PROCESSING

RELATED APPLICATIONS

This application is a national stage application of international patent application PCT/U.S.08/61600, filed Apr. 25, 2008, claiming priority from Chinese patent application, Application No. 200710102649.4, filed Apr. 25, 2007, entitled "METHOD AND APPARATUS FOR CLUSTER DATA PROCESSING".

BACKGROUND

This disclosure is related to the field of data processing technologies, and particularly to data processing methods systems based on a cluster.

As the computer and network technologies continuously develop, the ever-increasing processing demand and requirement for reliability of servers can no longer be satisfied by simply enhancing the hardware performance of the servers. Under this circumstance, cluster computing technology has gradually received widespread attention and use. A cluster refers to a kind of parallel or distributed system made up by a number of integrated computing devices (such as personal computers and servers) and used as a unified computing resource. If one of the servers in the cluster has failed to function, other servers within the same cluster could take over its services and jobs to provide a highly reliable network service. Furthermore, by using cluster computing technology, the load originally taken by a single server can be shared by other servers in the same cluster. This greatly increases the processing power of the system.

A cluster is formed by servers $b0, b1, \ldots bi$ and a load-balancing device. After receiving an external processing request, the load-balancing device selects a server from the cluster using a certain strategy based on physical aspects of the system to provide service to the outside. The selection, for example, may be based on current network connection of a server in the cluster. Under normal conditions, each server in the cluster provides a similar service. However, sometimes different servers may play different roles to provide different services. For instance, server $b0$ may handle data of major customers, while servers $b1$ and $b2$ may deal with data of general customers. In this case, as server $b0$ sends one or multiple sets of data containing a unique identity to the external server, the external server returns data of the processing result containing the same unique identity, requesting the returned data to be still processed by the same server $b0$.

In order to correctly return the processed data to the relevant server $b0$ in the above process, the usual practice in existing technology is to maintain network connection between external server and the cluster server $b0$ after the external server receives the data from the cluster server $b0$. Upon completing the processing, the server can then return the processing result to the server $b0$ directly through the maintained network link. However, this places a burden of network connection on the external server. This problem becomes more prominent when there are many targets to be served by the external server. An excessive number of network connections greatly consumes the resources of the external server and reduces its processing capabilities.

Therefore, new designs are desirable that can help correctly transmit the processed data from an external server to a relevant server in the cluster is an ongoing problem commonly faced in the field of cluster computing technology.

SUMMARY

The present disclosure describes a data processing method based on a cluster to solve the problems of heavy loads over server resources and to prevent low server processing performance caused by continuously maintaining network connection between an external server and a cluster for data transmission in existing technology. The disclosed cluster data processing method and system are based on a unique identity control without requiring continuous network connection between the servers in the cluster and an external computer.

One aspect of the disclosure is a cluster data processing method using a cluster including at least two servers. According to the method, the cluster sends a first data containing a first controlling identity record to an external computing device (such as an external server), and subsequently receives a second data at the cluster from the external computing device. The second data is the processing result of the first data and contains a second controlling identity record corresponding to the first controlling identity record of the first data. The first controlling identity record and the second controlling identity record each has a unique identity corresponding to each other and a control information corresponding to each other. The cluster then routes the second data according to the second controlling identity record of the second data.

The correspondence between the second controlling identity record and the first controlling identity record allows the cluster to identify the relation between the second data and the first data, and to use the control information contained in the second data for proper routing of the second data. In one embodiment, the unique identity of the second controlling identity record is identical to the unique identity of the first controlling identity record. Furthermore, the control information of the second controlling identity record may also be identical to the control information of the first controlling identity record.

In one embodiment of the method, the cluster has a load-balancing device, and the second data is received by the load-balancing device before being routed. The load-balancing device may either be a separate device or placed in one of the servers in the cluster.

Optimally, upon receiving the second data from the external server, the load-balancing device may also send the second data to a receiving server in the cluster according to a preset load-balancing rule. The receiving server then routes the second data according to the control information contained in the second data. In another embodiment, the receiving server may send the received second data to a routing middleware, which subsequently routes the second data according to the control information contained in the second data.

To control routing, the control information may contain the server location information to identify the desired server in the cluster as specified by the first data. In this case, routing the second data within the cluster according to the control information may include sending the second data to a receiving server selected according to the server location information. In one embodiment, if the receiving server selected according to the server location information has failed to function, an alternative receiving server is selected from the cluster according to a preset routing rule, and the second data is then transmitted to the alternative receiving server.

Another aspect of the disclosure is a cluster data processing system including at least two servers, a load-balancing device and the routing unit. Each server has a sending unit adapted to send a first data containing a first controlling identity record to an external computing device. The load-balancing device is adapted to receive a second data from the external server, wherein the second data contains a second controlling identity record corresponding to the first controlling identity record of the first data. The routing unit is adapted to route the second data according to the second controlling identity record contained in the second data.

The routing unit may be placed in one or more of the servers of the cluster. Upon receiving the second data, the load-balancing device transmits the second data to one of the servers hosting the routing unit according to a preset load-balancing rule. The hosting server has a receiving unit used to receive the second data from the load-balancing device. The routing unit in the hosting server routes the second unit according to the control information contained in the second data.

Alternatively, the routing unit may be a standalone device. The load-balancing device transmits the second data to a server of the cluster according to a preset load-balancing rule, and the server then sends the second data to the routing unit, which subsequently routes the second data according to the control information contained in the second data.

Optimally, the routing unit may further include a failure detection unit. The failure detection unit is used to detect whether the server selected according to the server location information is functioning properly. If not, an alternative server is selected based on the preset routing rule, and the second data is transmitted to the alternative server.

Compared with the existing technology, some exemplary embodiments disclosed herein may potentially have the following benefits. Taking advantage of the fact that the unique identity is not changed or modified in the data transmission, the disclosed method and system expand the unique identity into a controlling identity record by adding control information. Upon receiving the second data externally, present method and system realize the routing of the second data inside the cluster according to the control information in the controlling identity record in the second data. This ensures the second data to be processed by the right server even if the network connection between the server in the cluster and the external server has not been maintained. This helps to solve the problems of heavy load over server's resources and to prevent a reduction of the server's processing performance due to continuously maintaining network connection between the external server and the cluster server for data transmission in the existing technology. The concept disclosed herein breaks away from the prevailing understanding about the use of unique identity in the data transmission in the existing technology. The disclosed method and system achieve an upgrade in the processing between a cluster and external servers without requiring any change in the existing data structure and any modification of programs and systems of the external servers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
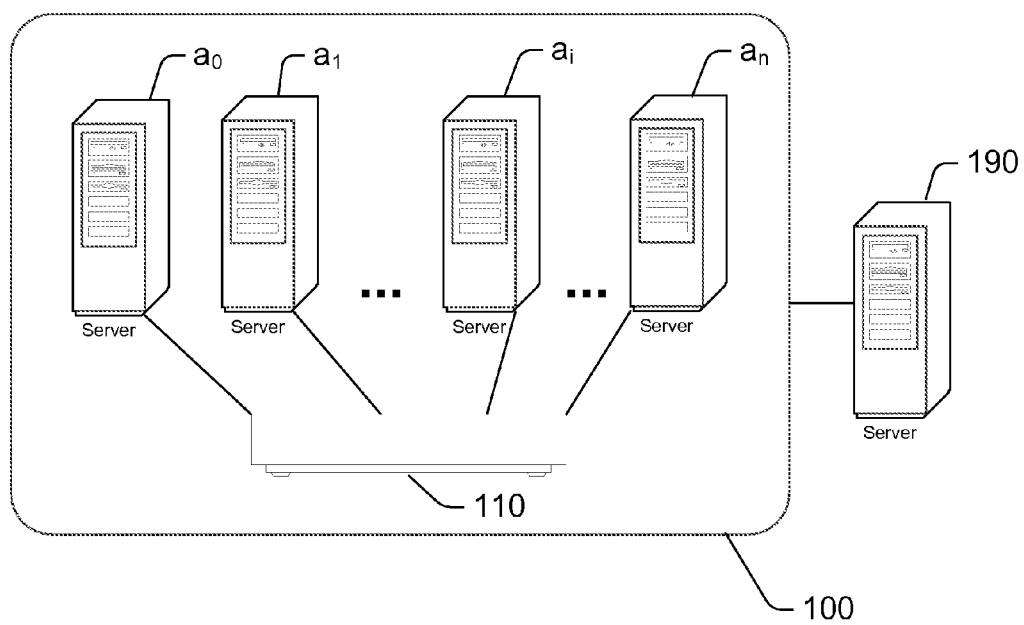
FIG. 1 shows a structural diagram of a common system using a cluster to perform data processing.

FIG. 1 shows a structural diagram of a common system using a cluster to perform data processing. The system in FIG. 1 has a cluster 100 and an external server 190. The cluster 100 is formed by servers (a0, a1, ... ai, ... and an) and a load-balancing device 110. In existing cluster computing technology, in order to allow data originally processed by a certain server ai in cluster 100 to be handled by the same server ai after the data is processed by external server 190, a continuous network connection between ai and the external server 190 needs to be maintained for data transmission. This practice occupies the resources of the servers and substantially reduces the processing performances of both the cluster servers (a0, a1, ... ai, ... and an) and the external server 190.

In the following, the cluster data processing method and system is first illustrated still with reference to FIG. 1 which is a structural diagram of a common cluster system. The difference between the disclosed cluster data processing method and system and the existing cluster computing technology lies in the implementation as described below.

The current disclosure describes a new way of setting up the unique identity sent out from the cluster 100 to external server 190. The method adds control information to the unique identity to expand the unique identity into a controlling identity record. The control information is specified in each data or a set of multiple data generated by a cluster server (a0, a1, ... ai, ... or an) according to specific requirements of that data or the set of multiple data. The controlling identity record passes from the original data sent by a cluster server to the external server 190 and maintains its identity and control properties. In principle, the identity and control properties may be maintained as long as there is a recognizable correspondence between the controlling identity record found in the data processed by the external server 190 and the controlling identity record in the original data sent by the cluster server a0, a1, ... ai, ... or an. One straightforward way to implement this, however, is to keep the controlled identity record unchanged. That is, the controlling identity record in the processed data is the same as the controlling identity record found in the original data sent by the cluster server. Because the controlling identity record according to the present disclosure has both a unique identity and a control information, an unchanged controlling identity record means that both the unique identity and the control information are kept unchanged. In the present disclosure, exemplary embodiments are illustrated assuming that an unchanged controlling identity record is used.

Since the controlling identity record remains unchanged when the data is being processed by external server 190, the cluster 100 can route the data received from external server 190 according to the control information in the controlling identity record. This allows the data to be processed by a relevant (or specified) server in the cluster and hence improves the data processing between the cluster 100 and the external server 190.

The cluster data processing method and system are explained in further details using the figures and exemplary embodiments below.

Figure 2:
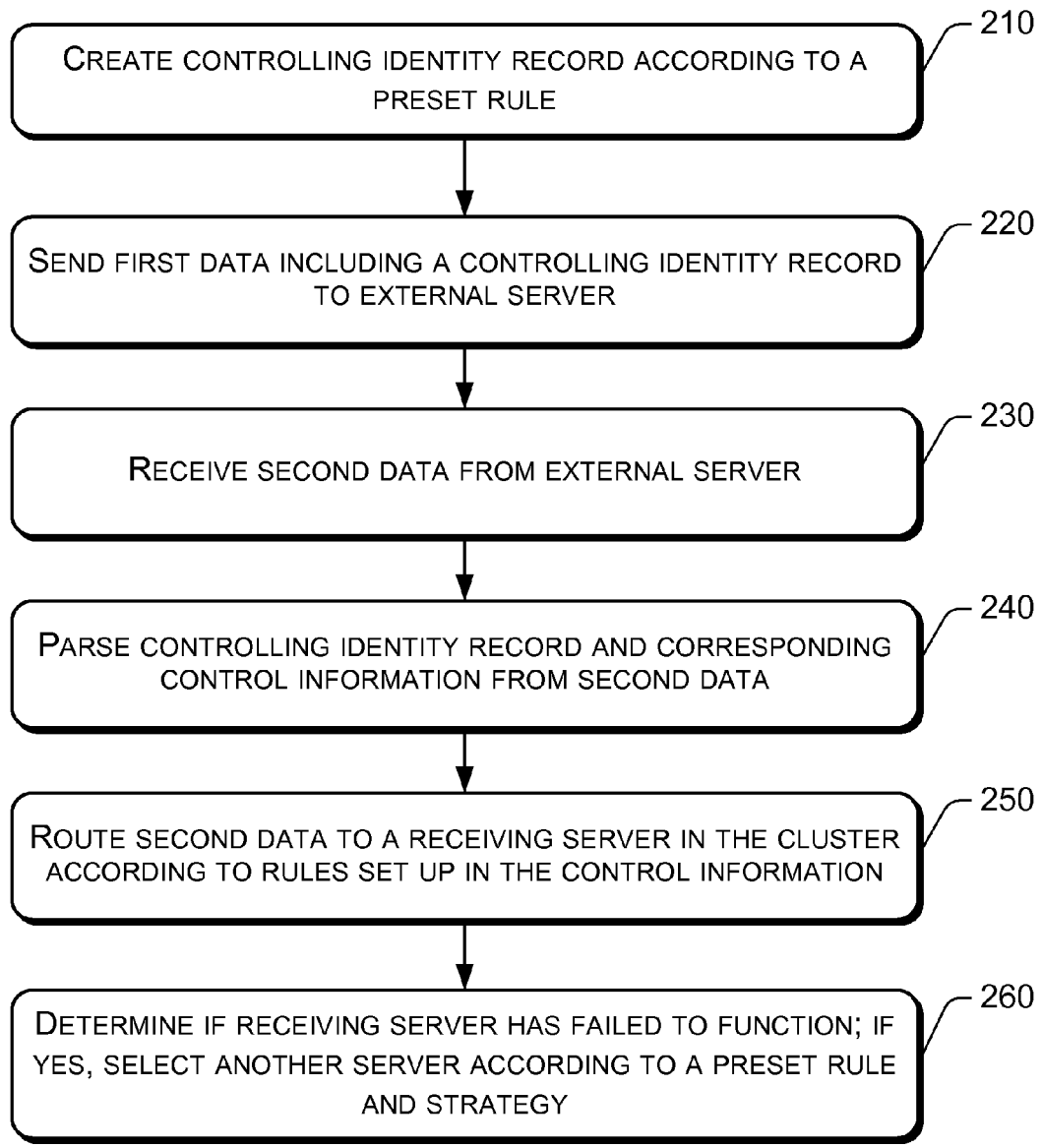
FIG. 2 is a flowchart showing an exemplary embodiment of the method in accordance with the present disclosure.

FIG. 2 is a flowchart showing an exemplary embodiment of the method in accordance with the present disclosure. The exemplary embodiment will be described in details in reference to FIG. 2 as follows. In this description, the order in which a process is described is not intended to be construed as a limitation, and any number of the described process blocks may be combined in any order to implement the method, or an alternate method.

At block 210, a server in the cluster 100 creates a controlling identity record according to a preset rule. As in existing technology, each set of data sent out from cluster to external server 190 includes a unique identity to distinguish itself from other data. In one embodiment, this unique identity remains unchanged throughout the time when the data is being processed by the external server 190 and returned to the cluster 100. Making use of this characteristic of the unique identity, the present disclosure adds control information to expand the unique identity into a controlling identity record. Specifically, in one exemplary embodiment, the controlling identity record contains a unique identity and a control information. The rule of creating the unique identity when practicing the disclosed method can be defined by the user in any suitable manner based on the needs, as long as a data identity is used. The control information is used to control how the data is processed subsequently in the cluster 190 and/or in the cluster 100. For instance, the control information may include the location information of a server or servers in the cluster desire to be used to process the data.

It is noted, however, that including server location information in the control information is only one exemplary way to implement control information in a controlling identity record. Those who are skilled in the art may set up other contents in the control information according to their own service needs. For example, the control information may have information related to the versions of programs to be used for data processing. The versions of the programs run by different servers in some clusters may be different. In this case, data processing may require to be performed by server(s) with programs of certain compatible or relevant versions. As such, one can set up the control information to include the program version required for the data. For another example, if the data must be processed by the server within a specified time, the control information can be set up to include a processing time that needs to be satisfied by the server to be selected to process the data.

At block 220, the server that processed a first data sends the first data to external server 190. In addition to the computing data itself, the first data includes the controlling identity record created at block 210. The computing data to be processed by the external server 190 and the controlling identity record are joined together to form the first data and sent to the external server 190.

In one preferred embodiment, when expanding the unique identity into a controlling identity record, the disclosed method does not change the original data structure of the unique identity. With regard to the first data sent to external server 190, its data structure and interface rules are not altered from that found in the existing technology so that the conformity, consistency and integrity of its semantics are maintained. Furthermore, it is not necessary to modify the original processing rules of the external server 190. When the control requirements of the data in the cluster 100 have changed, only the control information in the controlling identity record needs to be altered to suit the change. This greatly reduces the cost caused by making the changes to a cluster data processing system in accordance with the present disclosure.

At block 230, the cluster 100 receives a second data from external server 190. The second data is obtained by processing the first data by the external server 190 and returned from the external server 190 to the cluster 100. This second data contains a controlling identity record that is based on and corresponding to the controlling identity record of the first data. In one embodiment, the controlled identity record in the second data is identical to the controlling identity record of the first data. For purpose of illustration, the external server 190 is the device or system selected to perform data interaction with the cluster 100. However, it is conceivable that a separate computing device may be used to communicate the second data produced by the external server 190 to the cluster 100. It is also appreciated that the external server 190 may be a cluster itself. The disclosed method does not have any restrictions on the forms of the external server 190, nor on the ways of processing the first data by the external server 190 or any other external device or system.

The cluster 100 further has a load-balancing device 110 which is used to select a server in cluster 100 to provide the next service according to a certain selection strategy based on physical aspects of cluster 100 and its servers. The selection strategy, for instance, may be a random selection, or a selection based on current network connection of the server, etc. The load-balancing device 110 may be a specialized hardware separate from the servers, or a device placed in one of the servers in cluster 100. Whether to use specialized hardware to perform load-balancing when implementing the method disclosed herein will be at the discretion of the implementer.

At block 240, cluster 100 parses from the second data a controlling identity record including the control information contained therein. In one embodiment, for example, after receiving the second data, the load-balancing device 110 selects a server in the cluster 100 and sends the second data to be selected server. The server which received the second data parses out a unique identity and control information from the controlling identity record according to a preset rule.

At block 250, cluster 100 routes the second data according to the rules set up in the control information in the controlling identity record cocaine from the second data. Rerouting may be performed by the same server in the cluster that parsed the controlled identity record of the second data. Optimally, the control information may have server location information which describes the location of the server(s) in the cluster 100. According to the server location information in the control information, a suitable server is selected and the second data is then sent to the selected server. It is appreciated that when implementing the method described herein, one may set up the contents and the rules of the control information according to his own practical needs in order to properly route the second data according to the rules. For example, one can set the rule to select a server according to the version of the service provided by the server and/or the required processing time. This disclosure does not impose any restriction on how to set up the contents and the rules of the control information.

The cluster 100 may use a routing unit to route the second data to an appropriate server in the cluster upon selection. The routing unit may either be a stand-alone hardware separate from the servers, or a device placed in one or more of the servers in the cluster. In this exemplary embodiment, any server in the cluster can be used to route the second data.

Upon receiving second data from the external server 190, the load-balancing device 110 can randomly select a server in the cluster and send the second data to that server to be routed.

At block 260, an optional step is performed for failure protection. According to the server location information in the control information, the cluster 100 determines (using, e.g., the load-balancing device 110) whether the selected a server has failed to function. If the selected server has failed to function, an alternative server is selected based on a preset rule and strategy, and the second data is then sent to the alternative server for processing.

Furthermore, besides the unique identity and the control information, there could be other contents set up in the controlling identity record according to specific service needs. This disclosure does not have any restrictions for setting up such contents in the controlling identity record. For instance, one may encrypt and sign the data in the controlling identity record to improve the security of the data.

An exemplary use of a controlled identity record cluster is illustrated below. The example is found in a commercial business transaction, where the controlling identity record contains information of a purchase order.

Cluster 100 sends a datagram to server 190 requesting server 190 to deduct $100 from a user account having an account ID "customerAccountId". The datagram may be in the following form:

```
<orderId>12345876298708765635553223</orderId>
<customerAccountId>87634293882173710987</customerAccountId>
<requesterId>0987658932</requesterId>
<product>supermarket shopping</product>
<price>100.00</price>
<createDate>2007-04-19 12:01</createDate>
```

In the above example, the first line associated with "orderId" is the controlling identity record, which can be used in a manner described in present disclosure. In order to avoid server 190 from modifying or disavowing the contents of the datagram, the contents of the datagram may be encrypted based on a preset algorithm to obtain a summary (e.g., a hash sum or a hash value) of the encrypted content, which summary is then placed into the controlling identity record. In this example, the last sixteen digits of orderId (8708765635553223) are the summary of the contents of current datagram. To examine whether an error has occurred in the transaction, the contents of the datagram received by server 190 can be encrypted using the same algorithm to obtain a test summary. This test summary is compared with the original summary in the controlling identity record. If they are not the same, the datagram is determined to have been modified after the datagram has been sent to the server 190. Using encryption, the security of the data is thus improved.

In a second exemplary embodiment of this disclosure, upon receiving the second data, the server selected by the load-balancing device transmits the second data to a routing middleware. The routing middleware then routes this data according to the control information contained in the second data. The routing middleware may be an independent server, a dedicated server in the cluster, or one of the servers in the cluster. Comparing with the first exemplary embodiment, servers in the cluster in the second exemplary embodiment are no longer responsible for data routing. Instead, data routing is performed by the routing middleware. Since maintenance of routing service of each server is therefore avoided, this embodiment may reduce the maintenance complexity. The other aspects of the second exemplary embodiment are similar to that of the first exemplary embodiment and are not repeated here.

In still another exemplary embodiment, the functionalities of the load-balancing device and the routing middleware may be realized on a single integrated device. In this case, upon receiving data returned from the external server 190, the integrated device can consider load-balancing and control rules of relevant control information of the data as a whole to select a server in the cluster to complete processing of the data. Further details of the above exemplary embodiments are illustrated later with reference to FIGS. 4-5.

The cluster data processing method has been described above. In the following a practical example with an application environment is used to further explain the implementation of the method.

Figure 3:
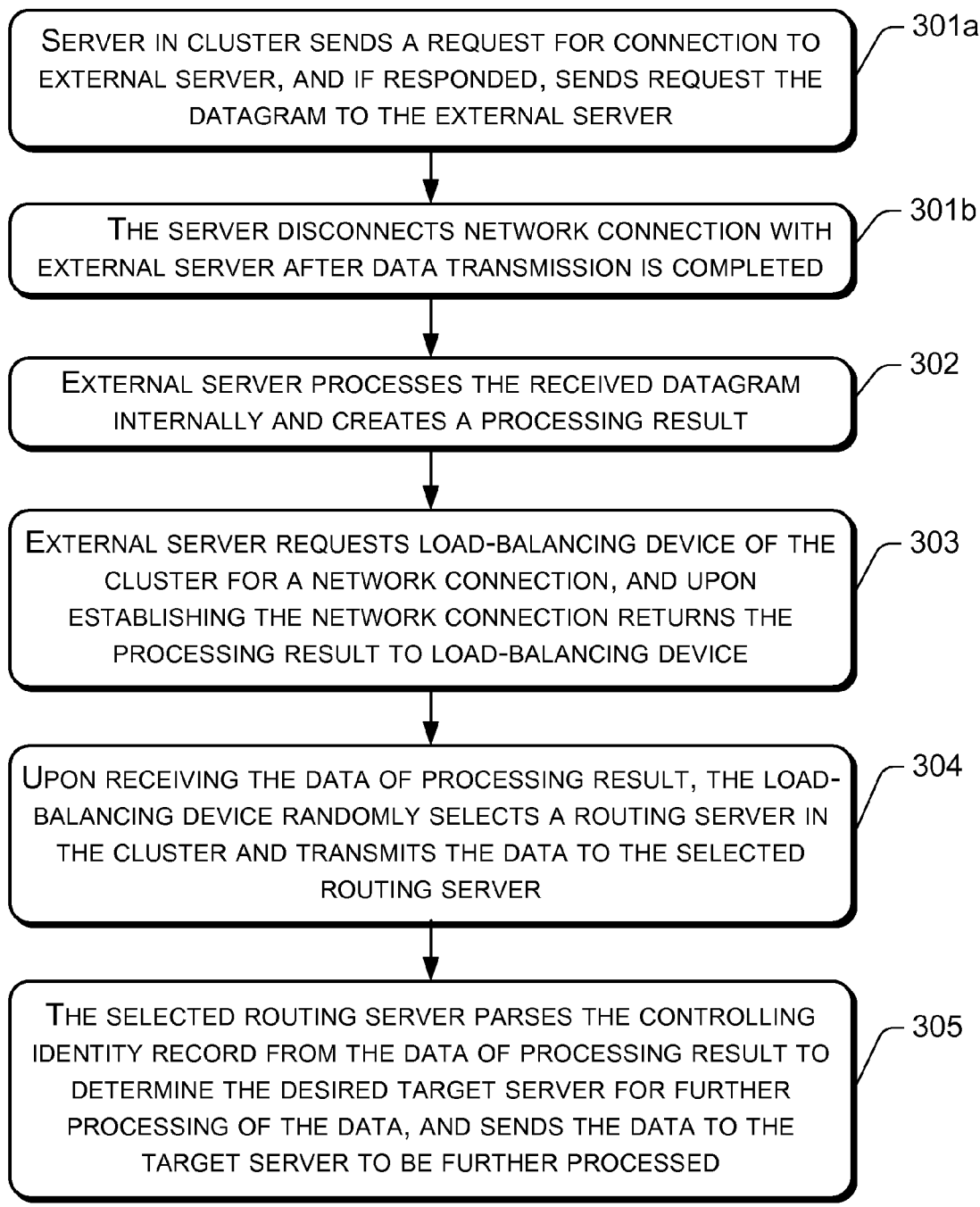
FIG. 3 is a flowchart showing an exemplary embodiment of the method with an application environment in accordance with the present disclosure.

FIG. 3 is a flowchart showing an exemplary embodiment of the method with an application environment in accordance with the present disclosure. In the practical example illustrated here, cluster 100 sends a payment request to server 190. Upon receiving this request, the server 190 completes the payment according to the order number specified in the payment request and returns the payment result. The details are described as follows.

At block 301*a*, a server (e.g., server a1) in cluster 100 sends a request for connection to the external server 190. If the external server 190 responds, a network connection will then be established between server a1 and server 190. The server a1 subsequently sends a request datagram to the server 190.

The contents of the request datagram sent from server a1 to server 190 are shown below:

```
<orderId>A111123</orderId>
<customerAccountId>87634293882173710987</customerAccountId>
<requesterId>0987658932</requesterId>
<product>supermarket shopping</product>
<price>100.00</price>
<createDate>2007-04-19 12:01</createDate>
```

In the above request datagram, <orderId>A111123</orderId> is the controlling identity record of the current datagram. A1 is control information which identifies the name of the server (a1) that has processed the order, whereas 11123 is a unique identity of the order specifying the order number.

At block 301*b*, the server a1 disconnects the network connection with the server 190 after data transmission is completed.

At block 302, external server 190 processes the received datagram and creates a processing result. In this example, external server 190 is requested to make a payment of $100.00 from customer account 87634293882173710987 and then create the processing result. The format of the processing result is:

```
<orderId>A111123</orderId>
<result>payment successful</result>
```

As shown above, the processing result includes a controlling identity record <orderId>A111123</orderId> which is identical to the controlling identity record contained in the original request datagram received from the cluster server a1. The external server 190 prepares the processing result to be returned to cluster 100. The controlling identity record <orderId>A111123</orderId> is included within the returned message of server 190.

At block 303, the external server 190 requests load-balancing device 110 for a new network connection, and upon establishing the network connection returns the processing result to load-balancing device 110. After data transmission is completed, the server 190 disconnects the network connection with load-balancing device 110.

At block 304, upon receiving the data of the processing result from server 190, the load-balancing device 110 randomly selects a routing server ai in cluster 100 and transmits the data received from the external server 190 to the selected routing server ai.

At block 305, after receiving the data from the external server 190, the selected routing server ai runs a routing program to parse the controlling identity record (which has a value of <orderId>A111123</orderId> in this example) and obtains the location information of the target server. In the present example, the value of the server location information is A1, which represents server a1, meaning that server a1 is the desired target server for further processing of the data. The routing server ai then sends the data received from the external server 190 to the server a1 to be further processed.

A cluster data processing method has been described using exemplary embodiments above. Another aspect of the present disclosure is a cluster data processing system, further details of which are described below.

Figure 4:
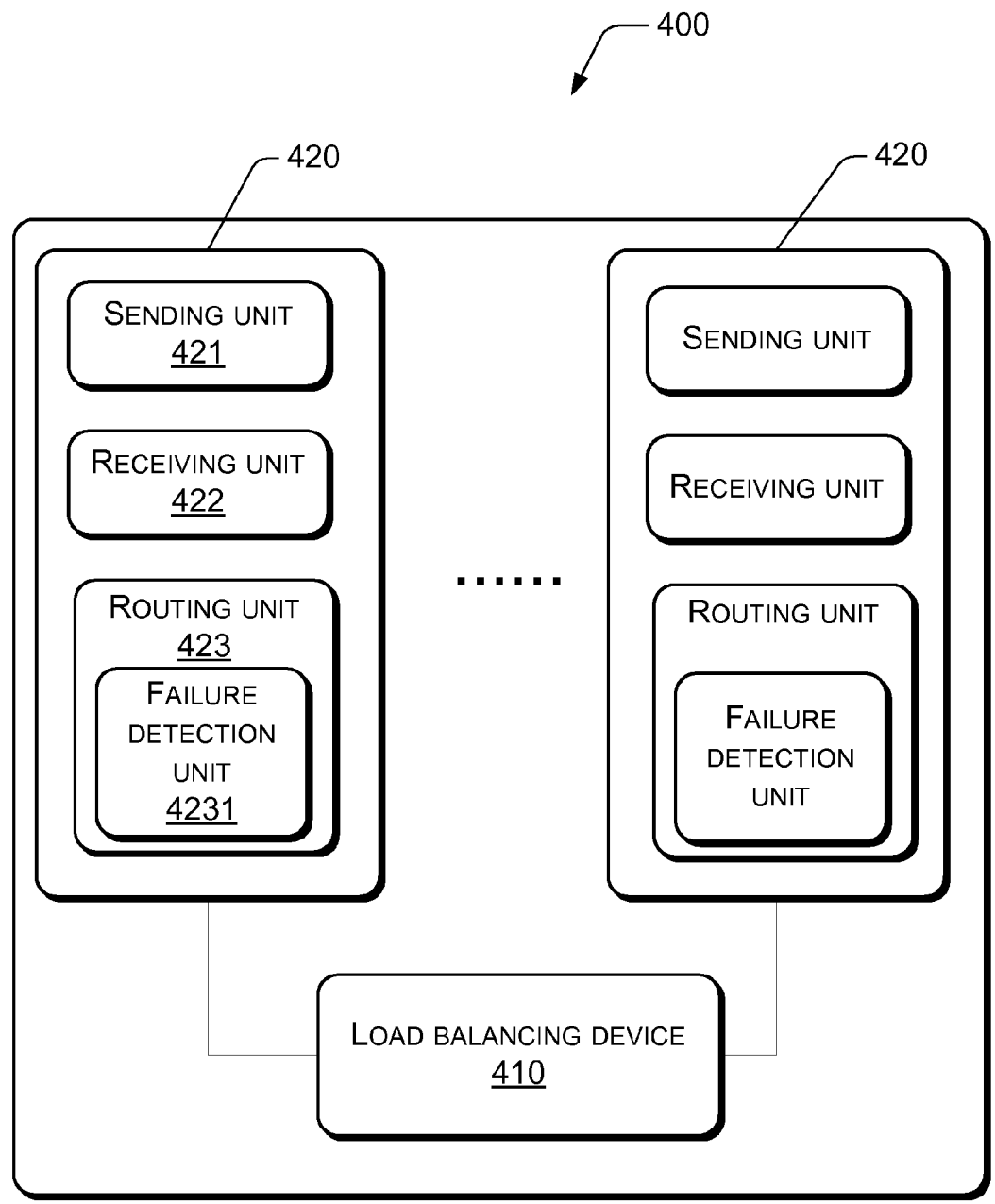
FIG. 4 shows an exemplary cluster data processing system in accordance with the present disclosure.

FIG. 4 shows an exemplary cluster data processing system in accordance with the present disclosure. The cluster data processing system 400 includes load-balancing device 410 and servers 420, of which only one is specifically illustrated as a representation of all servers 420 in the cluster.

Each server 420 has a sending unit 421 used to send out first data containing a controlling identity record to an external computing device (e.g., external server 190). The controlling identity record includes a unique identity and a control information corresponding to the first data.

The load-balancing device 410 receives a second data from the external computing device. The second data contains the same controlling identity record of the first data and the corresponding control information.

Each server 420 also has a receiving unit 422 which is used to receive the second data sent from the load-balancing device 410. Each server 420 further has a routing unit 423 which is used to route the second data to a proper target server among the servers 420 according to the control information contained in the second data.

With regard to the first data sent by the sending unit 421, the control information in the controlling identity record may contain location information of the particular server 420 which generated the first data. The second data received externally by the load-balancing device 410 also contains the same controlling identity record. Correspondingly, the control information of this controlling identity record also contains the location information of the particular server 420 which generated the first data.

Depending on how the load-balancing device 410 dispatches the second data, the server which receives the second data from the load-balancing device 410 may not be the same as the server which originally generated the first data. In the exemplary embodiment shown in FIG. 4, the receiving server is adapted to further route the second data to a desired target server, which in one example is the server which originally generated the first data. Specifically, after the server 420 receives the second data from the load-balancing device 410, the routing unit 423 transmits the second data to the server corresponding to the server location information specified in the control information contained in the controlling identity record.

Furthermore, the routing unit 423 may also include a failure detection unit 4231. The failure detection unit 4231 is used to check if the respective server 420 has failed to function. If it has failed to function, an alternative server among servers 420 would be selected according to a preset routing rule, and the second data is transmitted to the alternative server for processing.

Figure 5:
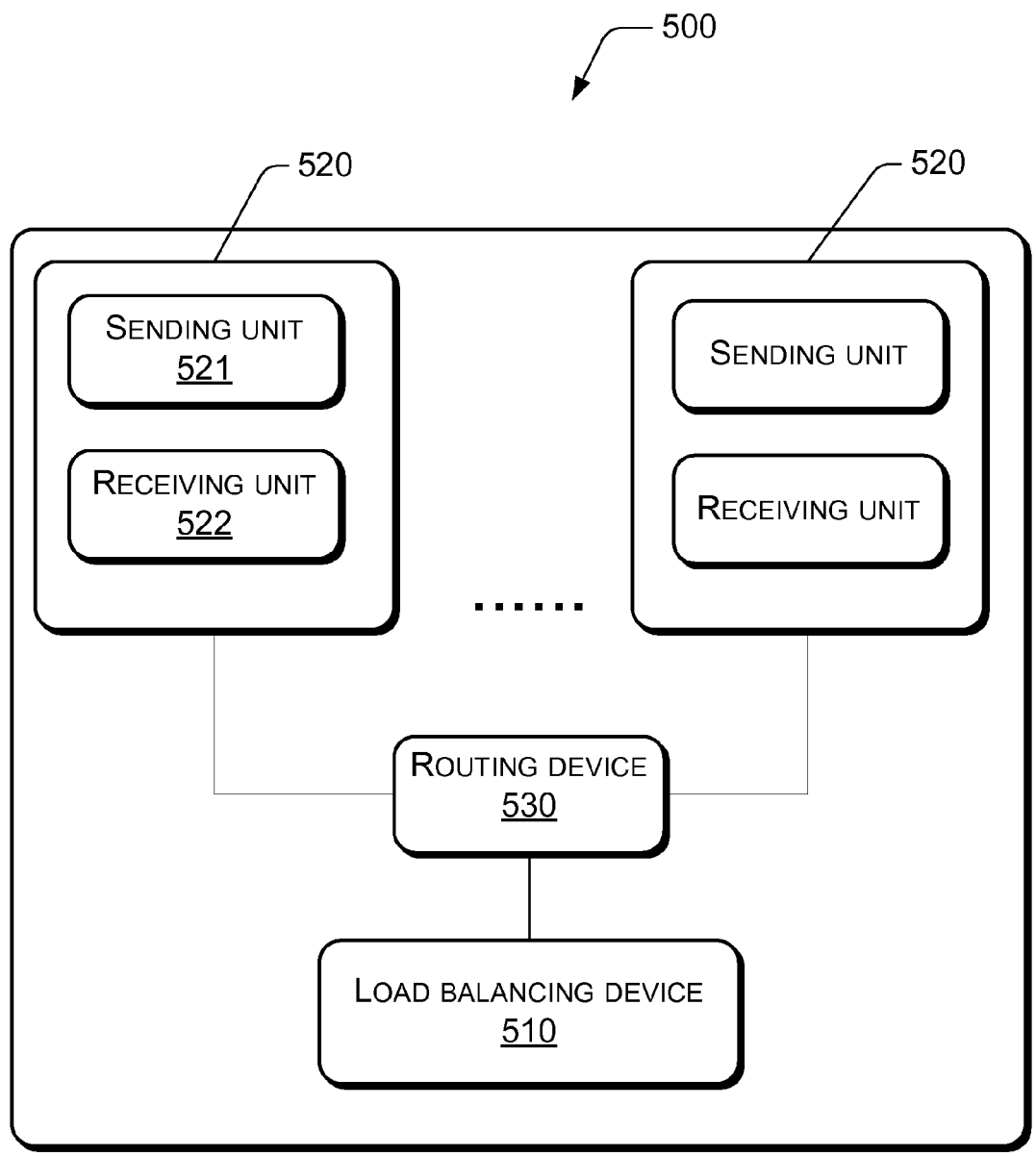
FIG. 5 shows another exemplary cluster data processing system in accordance with the present disclosure.

FIG. 5 shows another exemplary cluster data processing system in accordance with the present disclosure. The cluster data processing system 500 includes load-balancing device 510, servers 520 and routing middleware 530. Only one server 520 is specifically illustrated as a representation of all servers 520 in the cluster.

The cluster data processing system 500 is an alternative design to be cluster data processing system 400 shown in FIG. 4. The cluster data processing system 500 differs from the cluster data processing system 400 in one aspect, which is the configuration of the routing unit. Instead of having multiple routing units each placed in a server in the cluster data processing system 500, a separate routing device 530 is set up in the cluster 500 and connects with each server 520 in the same cluster 500. The load-balancing device 510 sends the second data to the routing unit 530, which then transmits the second data to a desired target server 520 according to the control information. The routing device 530 may be a standalone routing middleware.

Alternatively, the routing device 530 may be a routing unit either connected only to one or a few hosting servers among servers 520 or contained in the hosting server(s). This still differs from the cluster data processing system 400 in that here only one or just some of servers 520 are connected to or host a routing unit. After a hosting server receives the second data from the load-balancing device 510, it sends the second data to the routing unit. The routing unit then transmits this second data to a desired target server according to the control information contained in the second data for processing. Other aspects of the cluster data processing system 500 are similar to that of the cluster data processing system 400 and are not repeated here.

A cluster data processing method and its corresponding system has been described in details above. It is appreciated that the potential benefits and advantages discussed herein are not to be construed as a limitation or restriction to the scope of the appended claims. The examples are only illustrative to demonstrate the principles and exemplary implementation methods of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for processing data of a server cluster including at least two servers, the method comprising:
adding control information to a unique identity to expand the unique identity into a controlling identity record;
generating first data including the controlling identity record and processing data;
sending the first data to an external computing device;
receiving second data from the external computing device, the second data including the controlling identity record and a processing result of the processing data; and
transmitting the second data to a first server based at least on the control information, wherein the control information comprises one or more of version information of a program that processes the second data or a time threshold for the first server to process the second data, and the controlling identity record comprises information associated with a purchase order.

2. The method as recited in claim 1, wherein the controlling identity record further comprises a summary of the processing data that is encrypted under a predetermined mechanism.

3. The method as recited in claim 1, wherein the server cluster comprises a load-balancing device by which the second data is received before being transmitted.

4. The method as recited in claim 3, wherein the load-balancing device is located in a second server of the server cluster.

5. The method as recited in claim 1, further comprising: parsing the second data by a second server of the server cluster; and determining the controlling identity record associated with the second data.

6. The method as recited in claim 1, further comprising: transmitting the second data to a second server based at least on a preset load-balancing rule; and transmitting the second data to a routing middleware configured to transmit the second data based on the control information.

7. The method as recited in claim 1, further comprising: determining that the first server does not function properly and, in response, transmitting the second data to another server of the server cluster based at least on a preset routing rule.

8. The method as recited in claim 1, wherein the second data is generated by the external computing device based at least on the first data.

9. The method as recited in claim 1, further comprising receiving an external processing request, wherein the external processing request comprises information associated with a commercial business transaction.

10. The method as recited in claim 1, further comprising: after sending the first data to the external computing device, discontinuing network connection with the external computing device.

11. A system for processing cluster data, the system comprising:
   a plurality of servers configured to:
      add control information to a unique identity to expand the unique identity into the controlling identity record without changing a data structure of the unique identity;
      generate first data including processing data and the controlling identity record, send the first data to an external computing device;
   a load-balancing device configured to:
      receive, from the external computing device, second data including the
      processing data and the controlling identity record; and
   one or more routing units configured to:
      in response to determining that a first server of the plurality of servers functions properly, transmit the second data to the first server based at least on the controlling identity record,
      in response to determining that the first server of the plurality of servers does not function properly, transmit the second data to a second server based at least on a preset routing rule,
   wherein the control information comprises one or more of version information of a program that processes the second data or a time threshold for a server to be selected for processing the second data, and the controlling identity record comprises server location information associated with the plurality of servers.

12. The system as recited in claim 11, wherein the one or more routing units are located on at least one server of the plurality of servers.

13. The system as recited in claim 11, wherein the load-balancing device is further configured to transmit the second data to a receiving server of the plurality of servers based at least on a load-balancing rule.

14. The system as recited in claim 11, wherein the transmitting the second data to the server of the plurality of servers is based at least on the server location information.

15. A method implemented by a computing device, the method comprising:
   sending a first request for establishing a first network connection with an external computing device;
   after establishing the first network connection, sending first data to the external computing device, the first data comprising a controlling identity record and processing data;
   after sending the first data to the external computing device, disconnecting the first network connection with the external computing device;
   receiving a second request from the external computing device to establish a second network connection;
   after establishing the second network connection, receiving second data from the external computing device, the second data comprising the controlling identity record and a processing result of the processing data, wherein the controlling identity record comprises control information and information associated with a purchase order, and the control information comprises one or more of version information of a program that processes the second data or a time threshold for a server to be selected for processing the second data; and
   after receiving the second data from the external computing device, disconnecting the second network connection with the external computing device.

* * * * *